United States Patent Office 2,898,690
Patented Aug. 11, 1959

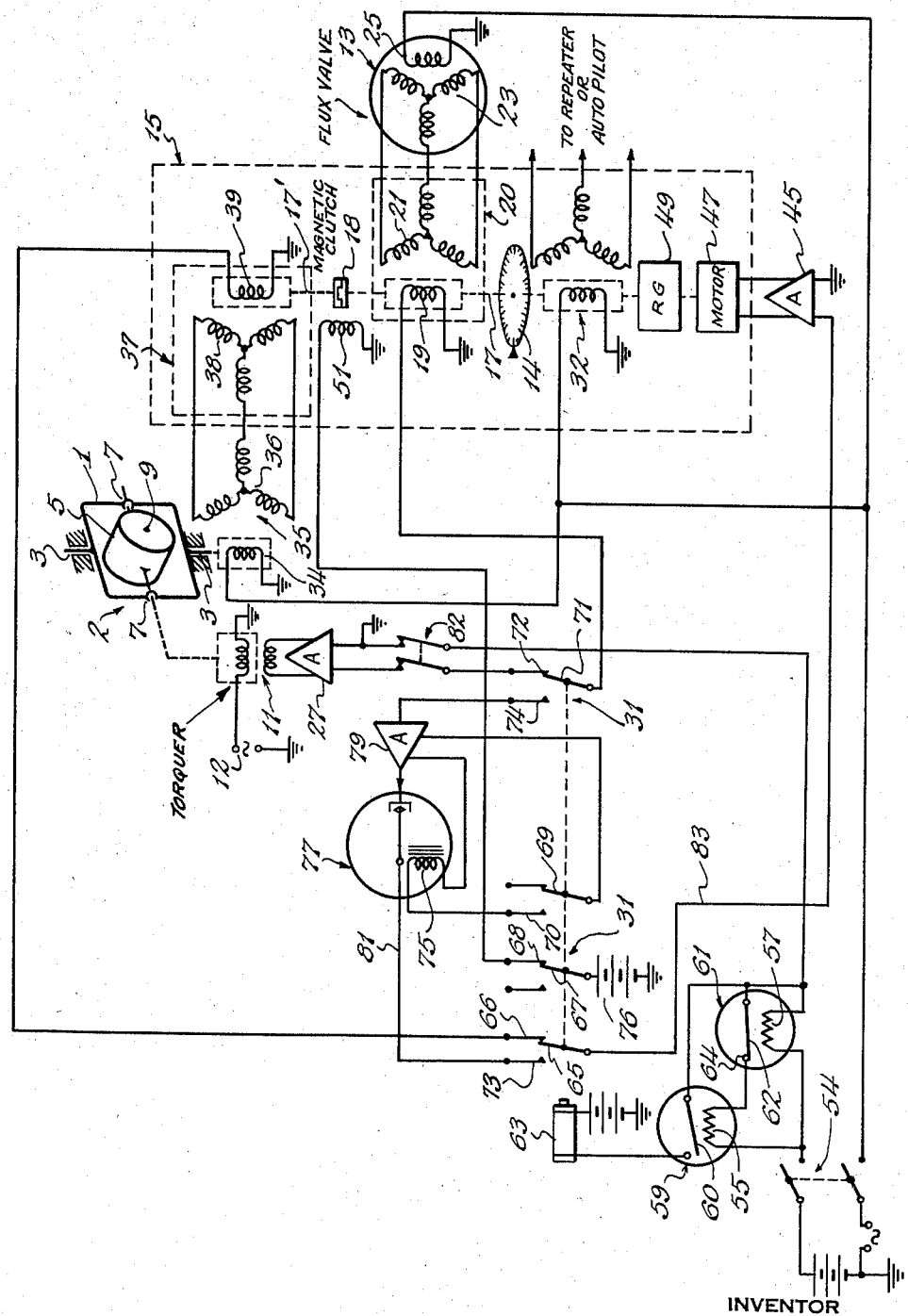

2,898,690

QUICK SETTING MEANS FOR GYRO MAGNETIC COMPASS

Walter P. Colistra, Huntington Station, N.Y., assignor to Sperry Rand Corporation, Great Neck, N.Y., a corporation of Delaware Application January 5, 1956, Serial No. 557,530

4 Claims. (Cl. 33—222)

This invention relates to gyro magnetic compass systems wherein a directional gyro is slaved to some form of magnetic compass to thereby integrate or average the readings of the latter instrument by providing a non-oscillatory stable reference monitored from the horizontal component of the earth's magnetic field as detected by some form of magnetic compass. Such systems are used both as visual aids to human pilots and as azimuth references for automatic pilots and other devices. The most common form of gyro magnetic compass uses the flux valve type of magnetic compass as the controller for the slaved gyroscope, such as shown in Patent No. 2,357,319, issued on September 5, 1944, to Esval and Frische for Flux Valve Magnetic Compass. The gyroscope may be in the form of a single directional gyroscope or may be the directional gyroscopic element of a more complex gyroscopic array such as a multi-gyro stable platform, one form of which is shown in Patent No. 2,591,697 to R. F. Hays, Jr., dated April 8, 1952.

It is usual and important in such systems to arrange the control of the directional gyroscope so that the gyroscope will follow the wanderings of the magnetic compass very slowly (on the order of 3° a minute), but this slow-following characteristic has the disadvantage that when the system is started up, the heading indicated by the system at first may differ from the proper magnetic heading by a large angle, and consequently a considerable delay may occur before the slowly precessed gyroscope has caused the system to indicate the direction demanded by the magnetic compass.

It is an important feature of this invention to provide an automatic means for bringing the heading indicated by the system very quickly into line with the heading demanded by the magnetic compass when the system is first switched on, by rapidly rotating the orienting elements of the system other than the slowly precessing stable gyroscope, without attempting to reset the gyroscope.

Another feature of this invention is the provision of a delayed action starting circuit which automatically first brings into action the quick-orienting means, then disconnects said means and restores normal connections after the system has been lined up with the magnetic compass.

More particularly, my invention is an improvement over the invention shown in the prior application of John S. Garwood, Serial No. 407,138, for Gyro Magnetic Compass System, filed January 29, 1954, whereby this prior quick synchronizing system is simplified so that only one servomotor and amplifier need be employed for both normal operation and the quick synchronizing operation. I thereby avoid using an extra synchronizing motor and amplifier, and a special designed differential synchro or synchros having both armature and field rotatably mounted, so that little extra equipment is needed for my quick synchronization.

Other objects and advantages will be understood from the following description and accompanying drawings in which a concrete embodiment is shown for the purposes of illustrating the principles of my invention.

The single sheet of drawings shows an elementary wiring diagram supplemented by a diagrammatic showing of the principal physical elements of my improved quick synchronizing gyro magnetic compass system. The slaved directional gyro 2 is illustrated as of conventional form having a vertical ring 1 mounted for freedom about a normally vertical axis 3—3 on the craft, a rotor case 5 journalled on horizontal trunnions 7—7 in the vertical ring within which case the rotor (not shown) is mounted for spinning about a spin axis 9 normally maintained level by an erection device (not shown). The gyroscope is normally slaved to the magnetic meridian by means of an electrical torquer 11 which exerts a weak torque about the horizontal axis of the gyroscope and causes it to precess in azimuth toward the meridian at a slow rate whenever the position of the directional gyroscope wanders from the position required by the magnetic compass.

The magnetic compass is shown in the form of a flux valve 13, such for instance as described in the aforementioned patent of Frische and Esval. I prefer to interpose between the flux valve and the directional gyroscope a relay or master indicating instrument 15 having a primary shaft 17 which is normally maintained fixed with respect to the magnetic meridian from the output of the gyro 2 as supervised by the flux valve 13. A compass card 14 may be fixed to said shaft. Errors in the deviation of the gyro 2 and of shaft 17 tied thereto with its card 14 with respect to the magnetic meridian are detected by a flux valve and synchro system which produces an error signal actuating a torquer on the gyroscope or other correction means. As shown, I mount on the shaft 17 the wound rotor 19 of a synchro transformer 20, the polycircuit stator 21 of which is connected to the output polycircuit winding 23 of the flux valve. There is thereby induced in winding 19 a second harmonic signal proportional to any error between the position in the earth's magnetic field at the flux valve 13 and winding 19 of synchro 20, as well understood in the art. The primary winding 25 of the flux valve is supplied with single phase, alternating, saturating current. The output of winding 19 is normally supplied to phase sensitive amplifier 27, which supplies the operating signal to the torquer 11 on the gyro 2 having a double frequency supply 12. Switch contacts 71 and 72 of the multi-contact relay 31 are interposed between winding 19 and amplifier 27, and it is only when ganged switch 31 is in the normal rightward position that torquer 11 is energized. Switch 82 (hereinafter referred to) is normally closed. Also mounted on shaft 17 is a synchro transmitter 32 adapted to actuate a repeater compass and/or to act as the base for an automatic pilot for the craft, as indicated by legends on the drawing.

The position of the shaft 17 is controlled from the slave gyro 2 by a synchronous system comprising a pair of synchro signal generators 35 and 37, the rotor 34 of generator 35 being mounted on the vertical axis 3 of the vertical ring of the gyro. The polycircuit output of stator 36 is connected to the polycircuit winding 38 of the signal generator 37. The armature 39 of generator 37 is mounted on a shaft 17 of the master indicator 15, which is normally clutched to shaft 17 by magnetic clutch 18. Whenever the position of the output winding 39 of the synchro generator 37 varies from its null position with respect to the winding 34 on generator 35, a reversible phase variable amplitude signal is generated which is shown connected to phase sensitive amplifier 45 to operate the servomotor 47 connected preferably through reduction gearing 49 to the shaft 17. Therefore, shafts 17 and 17' are normally turned together when the winding 51 on clutch 18 is excited, the magnetic clutch 18 being biased to the open position when winding 51 is deenergized.

By my invention, I provide means for automatically synchronizing a gyro magnetic compass system to the magnetic heading whenever power is supplied, and also whenever the system is switched from free to slaved operation. By means of my invention the human pilot is freed from the necessity of manually aligning the system with the meridian, or of having to operate successively a plurality of synchronizing switches, by providing a synchronizing cycle brought into action merely by starting up the system and requiring no further operation or special observations by the pilot.

A master switch is shown diagrammatically at 54 which closes circuits to both the single phase A.C. supply and a D.C. supply for certain auxiliary operations, such as heating the heater filaments 55, 57 of thermally controlled relay switches 59, 61. The thermostatically controlled switch 59 is normally open and is in circuit with the solenoid or electromagnet 63 which, when excited, moves a series of contact switch arms 65, 67, 69 and 71 to the left from the biased position shown in the diagram. When the master switch 54 is first closed, filament 55 is heated and the thermostatically positioned element 60 of the relay of switch 59 closes in about one-half a minute afterwards (for example) to allow sufficient time for stage 1 of the synchronizing cycle and the spinning up of the gyro rotor. Contacts 62, 64 of relay 61 are normally closed and the heater 57 thereof is shown as energized at the same time that heater 55 is energized. Thermal relay 61, however, has a longer time factor than relay 59 and is arranged so that it is opened about fifty seconds after the application of power, thus allowing some twenty seconds for stage 2 of the synchronizing cycle. The opening of said contacts 62, 64, it will be seen, breaks the circuit through heating element 55 so that a few seconds later contacts 59, 60 will open, thus deenergizing winding 63 with the result that the series of switches 65, 67, 69 and 71 are returned to the position shown in the drawings (phase 3), which is the normal position of the contact arms. It will be observed, therefore, that when the master switch is closed, the switch arms of relay 31 remains in the normal rightward position for some thirty seconds, during which time the magnetic clutch 18 is closed since contacts 67, 68 complete a circuit from source 76 through winding 51 to ground. Therefore, during this period the amplifier 45 is controlled from the output of the synchro 39 on shaft 17′ through the closed contacts 65, 66 so that shafts 17, 17′ are synchronized with the directional gyroscope. This likewise synchronizes the repeater compass and/or automatic pilot controlled from the selsyn or synchro transmitter 32 on the shaft 17.

However, when the contacts 59, 60 are closed, within thirty seconds thereafter the switch arms 65, 67, 69 and 71 of relay 31 are thrown to the left with the following results.

(1) Amplifier 45 and motor 47 are disconnected from the winding 39 of synchro 37 by the opening of contacts 65 and 66;

(2) Contacts 67 and 68 are opened, deenergizing the winding 51 of magnetic clutch 18 and permitting it to open, thus breaking the connection between shaft 17 and 17′;

(3) Contacts 69 and 70 are closed which causes the circuit to energize operating coil 75 of the chopper 77; and (4) Contacts 71, 72 are opened and contacts 71, 74 closed.

This last operation, it will be seen, breaks the slaving circuit between the amplifier 27 controlling torquer 11 and the winding 19 on the synchro 19, 21 controlled by the flux valve and transfers the output of the winding 19 to the amplifier 79 which supplies the chopper 77. The chopper 77 may be of the type manufactured by Airpax Products Company of Baltimore, Maryland, as its chopper model 303. A peculiar characteristic of the flux valve is that it operates on the second harmonic of the primary frequency and, therefore, is double the frequency of the A.C. supply. The purpose of the chopper is to reduce this double frequency of the output of the winding 19 to the frequency of the supply, thus assuring that the output of the chopper in lead 81 will be of the same frequency and properly phased with the main supply.

Lead 81 is shown as connected to the contact 73 so that when switch 65 is thrown to the left a circuit is completed through lead 83 to amplifier 45 controlling motor 47. Therefore, during this portion of the cycle, shaft 17 is positioned from the output of the flux valve and, therefore, the card 14 and the repeater motor controlled by synchro 32 will be oriented to the correct magnetic heading. It should be noted that this is accomplished quickly because any interference from the stabilized gyroscope is avoided by the opening of clutch 18.

Some seconds thereafter, as heater 57 warms the thermal switch arm 62, contacts 64, 62 will be opened causing the switch 59 to open shortly thereafter, thereby breaking the circuit to the relay coil 63. The four switches of said relay will, therefore, then be returned to their normal position, thus reconnecting the amplifier 45 to the synchro 39 controlled by the gyrocsope and reconnecting the slaving amplifier 27 to the output winding 19 controlled by the flux valve and again closing the clutch 18 by reenergizing the winding 51. Therefore, the system is again ready for operation as a complete gyro magnetic compass.

It will be noted that the operation of multi-contact transfer relay 31 is such that it is normally in a particular one of its positions, i.e. normally rightward, and is controlled by thermal switches 59 and 61 so as to move after a delay to another of its positions, i.e., leftward, and after an additional delay to return to its normal position, i.e. rightward.

It may be noted that in my system of quick synchronization no attempt is made to orient the directional gyro itself with respect to the magnetic meridian. This is unnecessary since the repeater compass (and the automatic pilot if employed) are controlled only from synchro 32 on shaft 17. This shaft is synchronized to the flux valve while clutch 18 is open, i.e., prior to its being finally controlled from the directional gyroscope.

An advantage of my system over the prior systems is that I employ only one amplifier and one servomotor and associated reduction gear train to perform two separate functions, namely, the normal control of the compass indications or of the automatic pilot from the output of the directional gyroscope (as supervised by the flux valve), and the fast synchronization system in which the control of the same amplifier and servomotor is temporarily placed is charge of the flux valve. This is all accomplished automatically simply by closing the main supply switch and without any special operations on the part of the human pilot.

It may be also observed that my system is adapted to quickly synchronize the system under the various other conditions described in the aforesaid application of John S. Garwood, such as quick synchronization after the gyroscope has been employed as a free directional gyroscope without supervision from the magnetic compass, as is frequently done in high latitudes as by disconnecting or opening switch 82 which temporarily severs the torquer 11 from the control of synchro 19 and also preferably opens the circuit through the heating elements 55 and 57 of the thermal relays 59 and 61. When it is desired to resume the gyro magnetic mode of operation, all the pilot need do is connect or re-close switch 82 which will set in motion applicant's quick synchronizing cycle, as explained.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A gyro magnetic compass system comprising a magnetic compass, a gyroscope of the directional type, means for normally slaving said gyroscope so as to slowly follow the demands of the magnetic compass, a heading indicating element, servo means positioning said element and normally controlled by the error between said gyroscope and element, a starting switch, thermal delay switches successively brought into action by the starting current, and a transfer relay normally in a particular one of its positions controlled by said thermal switches so as to move after a delay to another of its positions and transfer the control of said servo means to said magnetic compass for a period, and then to return to its normal position establishing normal operation.

2. A gyro magnetic compass system comprising a magnetic compass, a gyroscope of the directional type normally slaved thereto, a master compass indicator between said compass and gyroscope and normally controlled from said gyroscope as monitored from said magnetic compass, means producing a first error signal upon error between said indicator and gyroscope, a servomotor normally driving said indicator and normally controlled from said first signal, means producing a second error signal upon error between said indicator and magnetic compass, a starting switch, thermal delay switches successively brought into action by the starting current, and a transfer relay normally in a particular one of its positions controlled by said thermal switches so as to move after a delay to another of its positions for transferring the control of said servomotor to said second signal for a period, and then to return to its normal position for establishing normal operation.

3. A gyro magnetic compass system, comprising a magnetic compass, a gyroscope of the directional type, a heading indicating element, means for generating a first signal upon error between the position of said gyroscope and said element, servo means positioning said element and controlled by said first signal, means for generating a second signal upon error between said element and compass, gyro slaving means controlled by said second signal, a starting switch, thermal delay switches successively brought into action by the starting current, and a transfer relay normally in a particular one of its positions controlled by said thermal switches so as to move after a delay to another of its positions and transfer the control of said servo means to said second signal by the initial operation of said thermal switches.

4. A gyro magnetic compass system comprising a magnetic compass, a gyroscope of the directional type, means for normally slaving said gyroscope so as to slowly follow the demands of the magnetic compass, a switch for temporarily disconnecting said slaving means from control of said gyroscope, a heading indicating element, servo means positioning said element and normally controlled by the error between said gyroscope and element, thermal delay switches successively brought into action by actuating said slaving means disconnecting switch, and a transfer relay normally in a particular one of its positions controlled by said thermal switches so as to move after a delay to another of its positions and transfer the control of said servo means to said magnetic compass for a period, and then to return to its normal position for establishing normal operation.

References Cited in the file of this patent

UNITED STATES PATENTS

| 2,126,935 | Von Manteuffel | Aug. 16, 1938 |
| 2,140,191 | Schuchardt et al. | Dec. 13, 1938 |
| 2,421,042 | Thompson | May 27, 1947 |
| 2,524,756 | Braddon et al. | Oct. 10, 1950 |

FOREIGN PATENTS

| 818,850 | France | June 28, 1937 |